United States Patent

Liao

[11] Patent Number: 5,949,648
[45] Date of Patent: Sep. 7, 1999

[54] HEAT RADIATING DEVICE CAPABLE OF REDUCING ELECTROMAGNETIC INTERFERENCE

[75] Inventor: Chen Yen Liao, Taipei, Taiwan

[73] Assignee: Compal Electronics Inc., Taipei, Taiwan

[21] Appl. No.: 09/030,911

[22] Filed: Feb. 26, 1998

[51] Int. Cl.[6] .................................................. H05K 7/20
[52] U.S. Cl. .................. 361/700; 165/104.33; 174/15.2; 174/16.3; 361/707; 361/715
[58] Field of Search ...................... 165/104.21, 104.33; 174/16.3, 15.2; 361/689, 690, 700, 704, 708–710, 715–716, 719–720

[56] References Cited

U.S. PATENT DOCUMENTS 5,559,675  9/1996  Hsieh et al. ............................. 361/720
5,740,013  4/1998  Roesner et al. ......................... 361/715

*Primary Examiner*—Gregory Thompson
*Attorney, Agent, or Firm*—Bacon & Thomas PLLC

[57] ABSTRACT

A heat radiating device capable of reducing electromagnetic interference, including a circuit board disposed with a CPU and more than one heat dissipating IC (or chip set) and a housing composed of an upper and a lower heat conductive casings for enclosing the circuit board. The upper and lower heat conductive casings respectively thermally conductively contact with the heat dissipating surface and back face of the CPU and thermally conductively contacting with the heat dissipating surfaces of the heat dissipating IC from two faces of the circuit board. After the CPU and the heat dissipating IC are enclosed by the upper and lower heat conductive casings, the heat radiating area is increased and the electromagnetic interference to the CPU and the heat dissipating IC from other electronic elements is greatly reduced. The heat radiating device further includes a heat-pipe. One end of the heat-pipe is fixed between the upper/lower heat conductive casings and the CPU to contact with the CPU together with the upper/lower heat conductive casings so as to conduct the heat to the other end of the heat-pipe for forcedly radiating the heat.

16 Claims, 4 Drawing Sheets

HEAT RADIATING DEVICE CAPABLE OF REDUCING ELECTROMAGNETIC INTERFERENCE

BACKGROUND OF THE INVENTION

The present invention relates to a heat radiating device, and more particularly to a heat radiating device capable of better radiating heat generated by CPU and heat dissipating IC and capable of reducing electromagnetic interference (EMI) to CPU and heat dissipating IC.

It is known that CPU and some heat dissipating IC (chip set) have a working temperature over 70 C. The longer the working time is, the higher the working temperature is. The over-heated CPU and heat dissipating IC are apt to be damaged. Therefore, it is necessary to radiate the heat generated by the working CPU and heat dissipating IC so as to control the working temperature below the tolerable value (90 C).

According to a general heat radiating measure, heat radiating plate or heat conductive tank is directly attached to the CPU or the surface of the heat dissipating IC. The heat is conducted through a heat-pipe to a heat radiator to be radiated. No matter what measure is adopted, the heat is locally radiated from the CPU or the surface of the heat dissipating IC.

Accordingly, the CPU, heat dissipating IC and the peripheral electronic elements are arranged on a circuit board and open spaced from the electronic elements arranged on the other circuit board. With respect to a notebook type computer, due to limitation of space, the distance between the circuit boards is minimized. Under such circumstance, the EMI coming from other circuit board will not damage the CPU. However, such EMI quite tends to interfere the CPU and result in malfunction. Intel disclosed a CPU structure enclosed in a housing for radiating heat and reducing EMI to the CPU from other electronic elements. However, such structure only serves to locally protect the CPU, while failing to provide further protection for the entire circuit board and other heat dissipating IC on the circuit board.

SUMMARY OF THE INVENTION

It is a primary object of the present invention to provide a heat radiating device capable of not only protecting the entire circuit board from electromagnetic interference (EMI) generated by other electronic elements but also entirely achieving good heat radiating effect for the CPU and heat dissipating IC arranged on the circuit board.

According to the above object, the heat radiating device of the present invention includes a circuit board disposed with a CPU and more than one heat dissipating IC (or chip set) and a housing composed of an upper and a lower heat conductive casings for enclosing the circuit board. The upper and lower heat conductive casings respectively thermally conductively contact with the heat dissipating surface and back face of the CPU and thermally conductively contacting with the heat dissipating surfaces of the heat dissipating IC from two faces of the circuit board. After the CPU and the heat dissipating IC are enclosed by the upper and lower heat conductive casings, the heat radiating area is increased and the electromagnetic interference to the CPU and the heat dissipating IC from other electronic elements is greatly reduced. The heat radiating device further includes a heat-pipe. One end of the heat-pipe is fixed between the upper/lower heat conductive casings and the CPU to contact with the CPU together with the upper/lower heat conductive casings so as to conduct the heat to the other end of the heat-pipe for forcedly radiating the heat.

The present invention can be best understood through the following description and accompanying drawings, wherein:

DETAILED DESCRIPTION OF THE PREFERRED EMBODIMENTS

Figure 1:
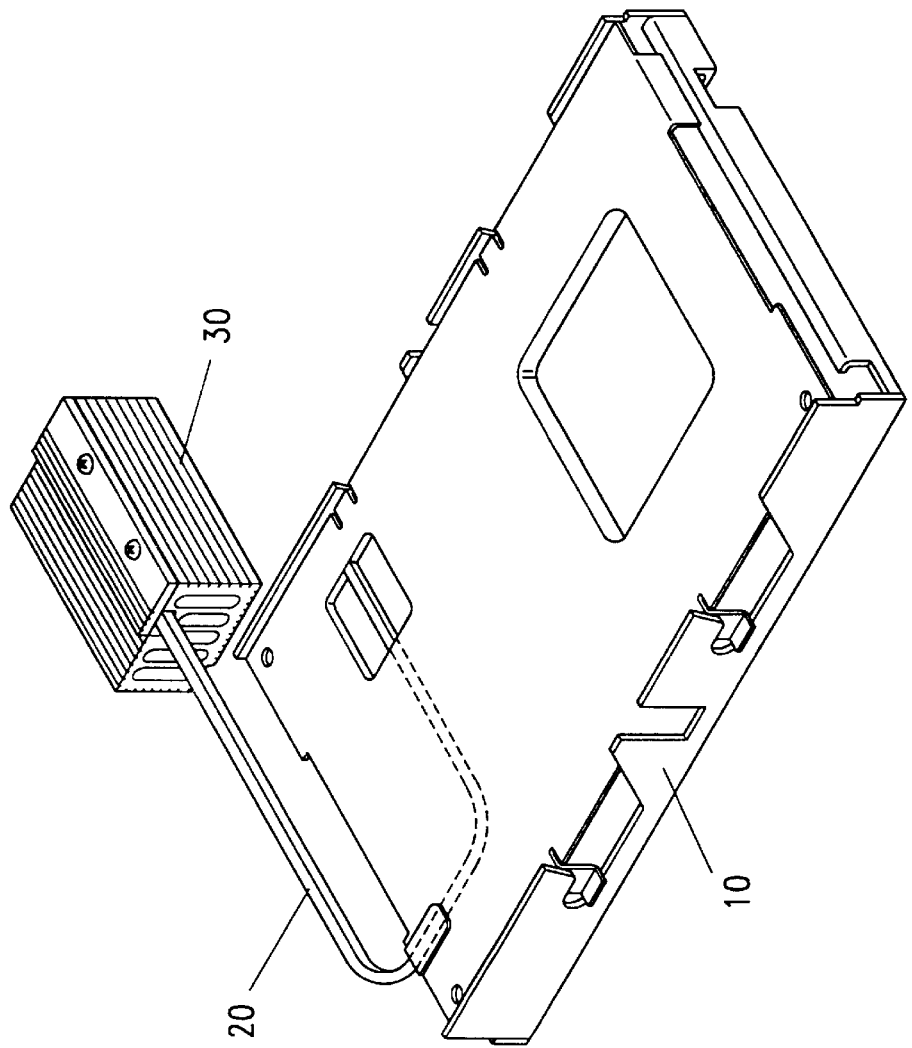
FIG. 1 is a perspective assembled view of a preferred embodiment of the Present invention.

Please refer to FIG. 1. According to a preferred embodiment, the heat radiating device of the present invention includes a housing 10 enclosing a circuit board (not shown) having a CPU and more than one heat dissipating IC. The housing 10 serves to prevent the CPU and the heat dissipating IC from suffering EMI generated by the electronic elements of other circuit boards during working. The housing 10 also serves to conduct the heat generated by the CPU and some heat dissipating IC to the surface of the housing 10 for natural radiation. By means of the housing 10, the heat radiating area is increased to achieve a good heat radiating effect. Moreover, in order to more quickly lower the temperature of the CPU, one end of a heat-pipe 20 contacts with the CPU (not shown) for conducting the heat thereof through the heat-pipe 20 to the other end on outer side so as to forcedly radiate the heat. The heat accumulated at the other end of the heat-pipe is radiated by an additional heat radiator 30.

Figure 2:
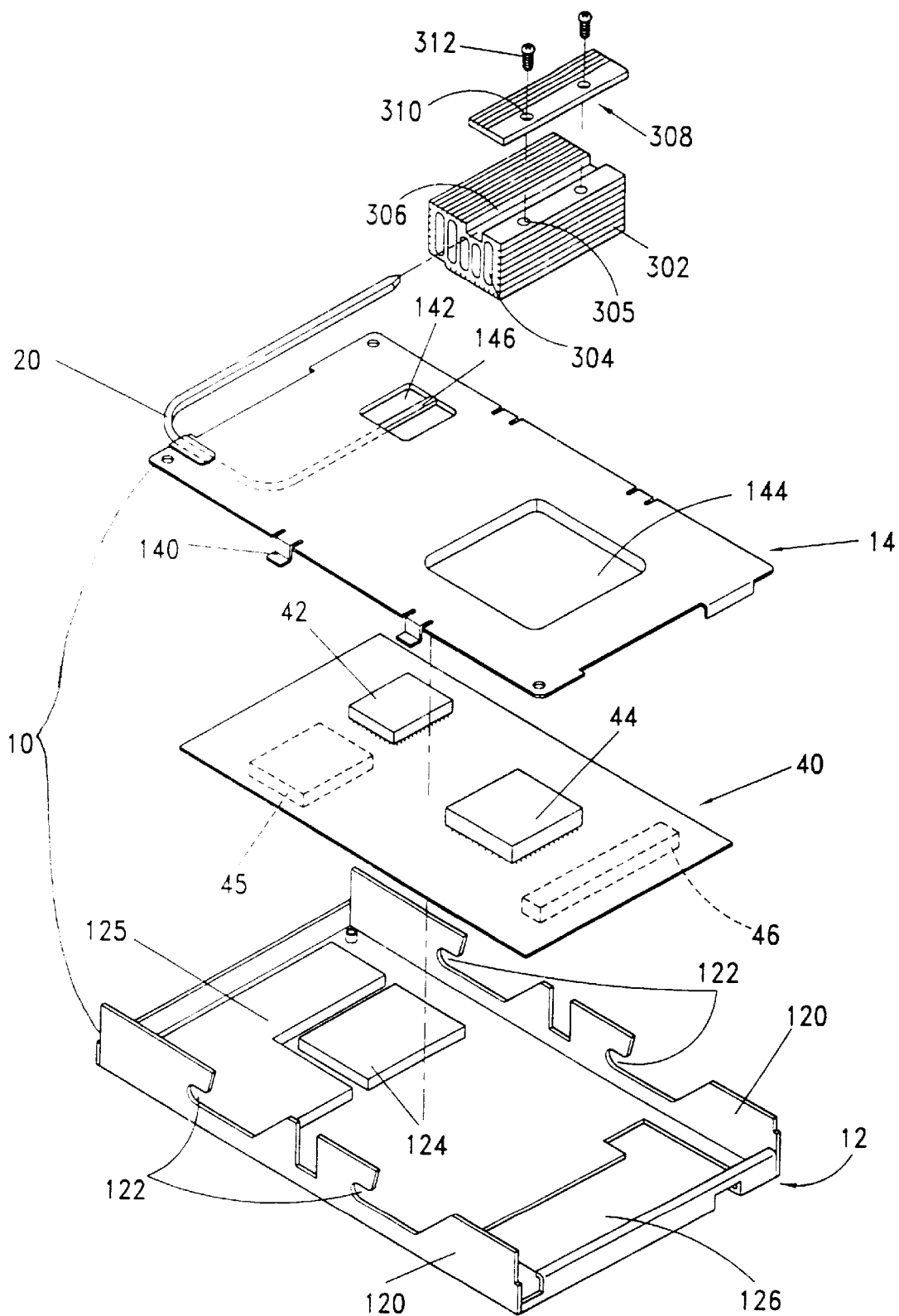
FIG. 2 is a perspective disassembled view of according to FIG. 1.

Please refer to FIG. 2. A circuit board 40 is received in the housing 10. A CPU 42 and other heat dissipating IC 44, 45 (two in this embodiment) are inserted or adhered on the circuit board 40 respectively on different faces thereof. A connector 46 is disposed at front edge of bottom face or other position of the circuit board 40. The housing 10 includes a lower heat conductive casing 12 and an upper heat conductive casing 14. The lower heat conductive casing 12 has two lateral walls 120 formed with forward inclined slide notches 122. A first and a second heat conductive tanks 124, 125 are located on the inner surface of the lower heat conductive casing 12 corresponding to the CPU 42 and the heat dissipating IC 45 of the circuit board 40. The front end or other suitable position of the lower casing 12 is formed with a window 126 through which the connector 46 of the circuit board 40 is passed to electrically connect with a corresponding connector (not shown) Two sides of the upper casing 14 are disposed with engaging hooks 140 corresponding to the slide notches 122 of the lower casing 12, whereby the upper casing 14 can be mated and locked with the lower casing 12. Alternatively, the upper and lower casings can be mated and assembled with each other by other measures such as latching or adhesion. Similarly, the inner surface of the upper casing 14 is disposed with a third and a fourth heat conductive tanks 142, 144 corresponding to the CPU 42 and the heat dissipating IC 44 of the circuit board 40. Accordingly, the first and third heat conductive tanks 124, 142 can tightly clamp the CPU 42 from two faces of the circuit board 40, while the second and fourth heat conductive tanks 125, 144 respectively contact with the heat dissipating surfaces of the heat dissipating IC 45, 44. Therefore, the heat generated by the CPU 42 and the heat dissipating IC 45, 44 is conducted to the entire surfaces of the upper and lower casings 14, 12 to be naturally radiated. Accordingly, the heat radiating area is increased to achieve a good heat radiating effect. The above heat conductive tanks 124, 125, 142, 144 can be metal blocks, metal boards, thermal pad or thermal jelly with a certain thickness. In the case that a clearance exists between the housing 10 and the CPU 42 and the heat dissipating IC 44, 45, the heat conductive tanks serve to interconnect the housing 10 with the CPU 42 and the heat dissipating IC 44, 45. In the case of no clearance, the housing 10 will directly contact therewith. Alternatively, the heat conductive tanks 124, 125, 142 or 144 can be integrally formed by punching the housing 10 with dents with a depth corresponding to the thickness of the clearance. Such measure can reduce the cost without secondary processing.

In addition, in order to more quickly radiate the heat of the CPU 42, the present invention can further include a heat-pipe 20. One end of the heat-pipe is fixedly disposed between the upper/lower casings 14/12 and the CPU 42 to contact with the CPU 42 together with the upper and lower casings 14/12. In this embodiment, the heat-pipe is positioned in a guide channel 146 punched on the third heat conductive tank 142. The other end of the heat-pipe extends to outer side of the upper/lower casings so as to conduct the heat to the other end of the heat-pipe 20. The other end of the heat-pipe 20 is connected with a heat radiator 30 for enhancing the heat radiating effect. The heat radiator 30 includes a tube body 302 formed with multiple internal wind passages 304. The top face of the tube body 302 is formed with thread holes 305 and a groove 306 for fixing the other end of the heat-pipe 20. A cover board 308 is used to cover the groove 306. The cover board 308 is formed with thread holes 310 corresponding to the thread holes 305 of the tube body 302, whereby screws 312 can be screwed into the thread holes 310, 305.

Alternatively, without the cover board 308, the other end of the heat-pipe 20 can be directly adhered in the groove 306. The above heat radiator 30 can be substituted by other heat radiators such as the general fin type heat radiator.

Figure 3:
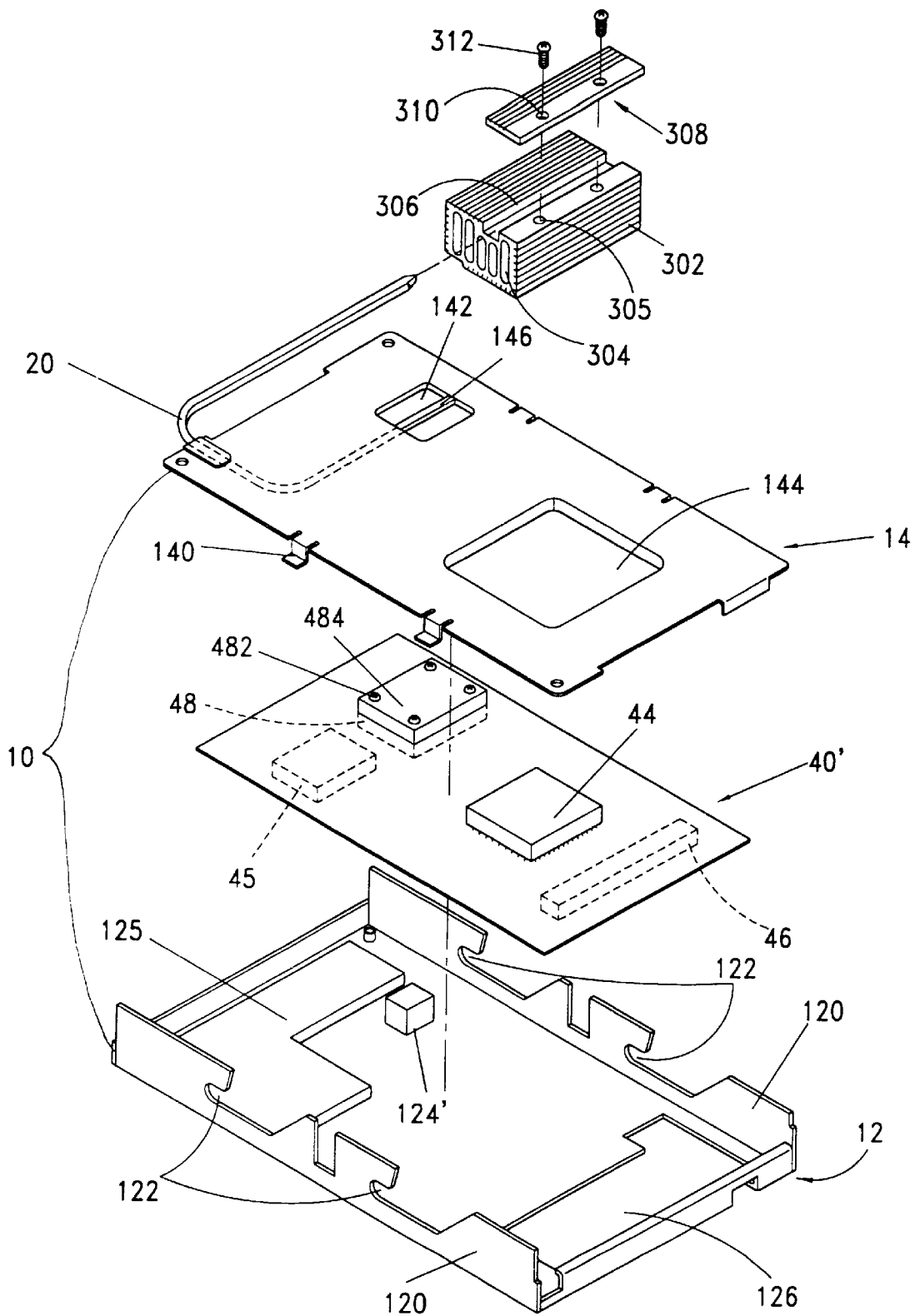
FIG. 3 is a perspective disassembled view of another embodiment of the present invention modified from FIG. 2.
Figure 4:
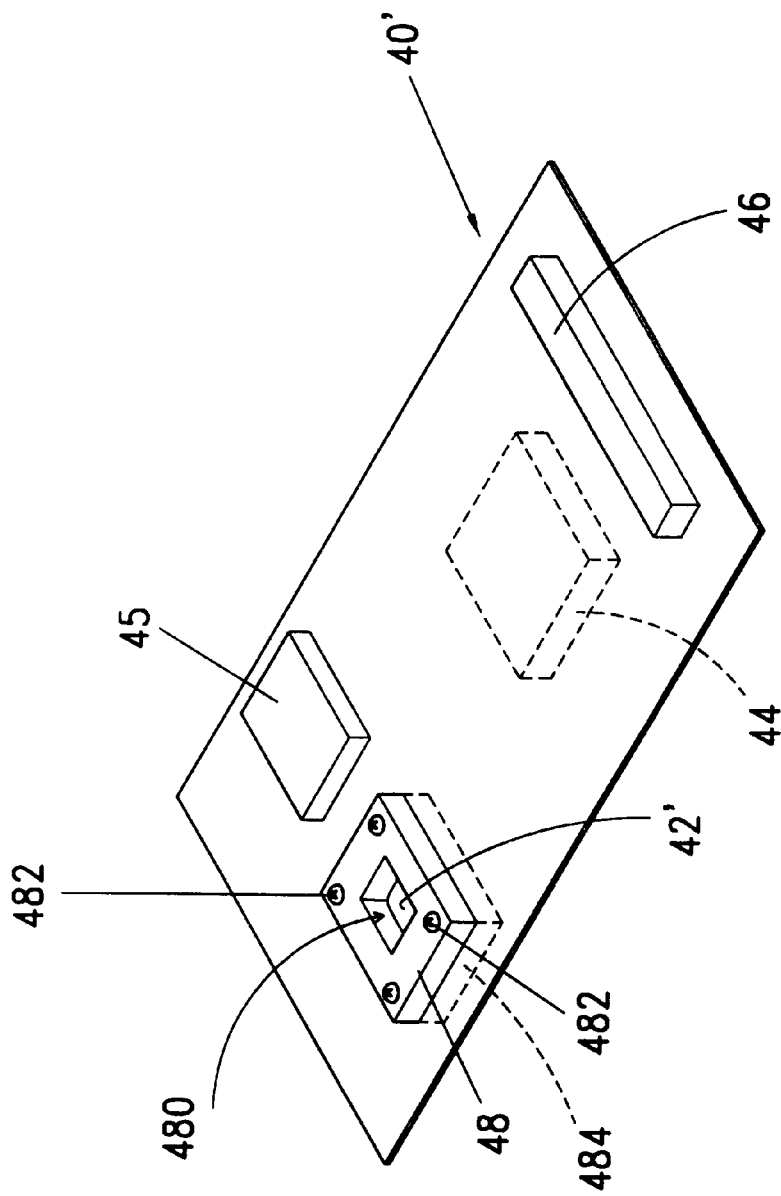
FIG. 4 is a rotated perspective view of the circuit board of FIG. 3.

FIGS. 3 and 4 show another embodiment of the present invention. In FIG. 2, the CPU 42 of the circuit board 40 can be AMD or PENTIUM II CPU, while the circuit board 40' in FIGS. 3 and 4 is an Intel Mobile Module (IMM) board containing PENTIUM I CPU 42'. The CPU 42' of the IMM board is covered by a casing 48 formed with CPU heat radiating hole 480 as shown in FIG. 4. The corners of the casing 48 is disposed with two fixing bolts 482 extending through the circuit boards 40' as shown in FIG. 3. A heat radiating plate 484 is mounted at the free end of the fixing bolt 482. With respect to the IMM board, the dimension of the first heat conductive tank 124 of the lower casing 12 is changed to a heat conductive tank 124' corresponding to the CPU heat radiating hole 480 so as to protrude the top face of the heat conductive tank 124' out of the CPU heat radiating hole 480 to contact with the heat dissipating surface of the CPU 42'. The third heat conductive tank 142 of the upper casing 14 and the heat-pipe 20 in the guide channel 146 thereof can tightly abut against the heat radiating plate 484 to achieve the same effect as FIG. 2.

In conclusion, the heat radiating device of the present invention is able to reduce EMI and increase heat radiating area. A heat radiator can be externally connected with the heat-pipe to enhance the heat radiating effect of the CPU.

It should be noted that the above description and accompanying drawings are only used to illustrate some embodiments of the Present invention, not intended to limit the scope thereof. Any modification of the embodiments should fall within the scope of the present invention.

What is claimed is:

1. A heat radiating device capable of reducing electromagnetic interference, comprising:

a circuit board having a CPU exposed on two sides of the circuit board, each side of the circuit board also having at least one other heat dissipating IC exposed on one side of the circuit board;

upper and a lower heat conductive casings enclosing the circuit board, the upper and lower heat conductive casings respectively contacting a heat dissipating surface of the CPU and a back face of the CPU on opposite sides of the circuit board for thermally conducting heat from the CPU, the upper and lower heat conductive casings also contacting a heat dissipating surface of the heat dissipating IC on each side of the circuit board; and a heat-pipe arranged on one side of one of the casings for contacting the CPU and conducting heat to the other end of the heat-pipe.

2. A heat radiating device as claimed in claim 1, further comprising a heat radiator fixed at the other end of the heat-pipe for dissipating the heat accumulating there.

3. A heat radiating device as claimed in claim 2, wherein the heat radiator includes a tube body formed with multiple internal wind passages.

4. A heat radiating device as claimed in claim 3, wherein a top face of the tube body is formed with a channel for receiving and fixing the other end of the heat-pipe therein.

5. A heat radiating device as claimed in claim 4, wherein one side of the channel of the tube body is formed with at least one thread hole, the heat radiator further including a cover board for covering the channel and fixing the other end of the heat-pipe in the channel, a top face of the cover board being formed with thread hole corresponding to the thread hole of the tube body for screw to screw therein.

6. A heat radiating device as claimed in claim 1, wherein the circuit board is an Intel™ Mobile Module (IMM) board.

7. A heat radiating device as claimed in claim 1, wherein the upper and lower heat conductive casings include a plurality of heat sinks, each sink contacting at least one of the heat dissipating surface and the back face of the CPU and the heat dissipating surfaces of the IC.

8. A heat radiating device as claimed in claim 7, wherein the heat sinks are heat conductive tanks integrally formed on the heat conductive casings.

9. A heat radiating device as claimed in claim 7, wherein the heat sinks include depressions on the heat conductive casings for contacting the corresponding CPU or IC.

10. A heat radiating device as claimed in claim 9, wherein the heat sinks include materials selected from the group consisting of metal blocks, metal boards, thermal pads, or thermal jellies.

11. A heat radiating device capable of reducing electromagnetic interference, comprising:

a circuit board having a CPU exposed on two sides of the circuit board, each side of the circuit board also having at least one other heat dissipating IC exposed on one side of the circuit board;

upper and a lower heat conductive casings enclosing the circuit board, the upper and lower heat conductive casings respectively contacting a heat dissipating surface of the CPU and a back face of the CPU on opposite sides of the circuit board for thermally conducting heat from the CPU, the upper and lower heat conductive casings also contacting a heat dissipating surface of the heat dissipating IC.

12. A heat radiating device as claimed in claim 11, wherein the circuit board is an Intel™ Mobile Module (IMM) board.

13. A heat radiating device as claimed in claim 11, wherein the upper and lower heat conductive casings include a plurality of heat sinks, each sink contacting at least one of the heat dissipating surface and the back face of the CPU and the heat dissipating surfaces of the IC.

14. A heat radiating device as claimed in claim 13, wherein the heat sinks include heat conductive tanks integrally formed on the heat conductive casings.

15. A heat radiating device as claimed in claim 13, wherein the heat sinks include depressions on the heat conductive casings for contacting the corresponding CPU or IC.

16. A heat radiating device as claimed in claim 13, wherein the heat sinks include materials selected from the group consisting of metal blocks, metal boards, thermal pads, or thermal jellies.

* * * * *